United States Patent [19]

Miller

[11] 4,360,419
[45] Nov. 23, 1982

[54] CATALYTIC DEWAXING

[75] Inventor: Stephen J. Miller, San Francisco, Calif.

[73] Assignee: Chevron Research Company, San Francisco, Calif.

[21] Appl. No.: 219,129

[22] Filed: Dec. 22, 1980

[51] Int. Cl.$^3$ .................... C10G 11/05; C10G 47/18
[52] U.S. Cl. .................... 208/111; 208/120; 423/328; 423/335; 252/455 Z
[58] Field of Search .................... 208/120, 111

[56] References Cited

U.S. PATENT DOCUMENTS

| | | | |
|---|---|---|---|
| 3,970,544 | 7/1976 | Rosinski et al. | 208/120 X |
| 4,046,859 | 9/1977 | Plank et al. | 423/328 |
| 4,116,813 | 9/1978 | Rubin et al. | 423/328 X |
| 4,187,283 | 2/1980 | Kokotailo et al. | 423/328 |
| 4,282,085 | 8/1981 | O'Rear et al. | 208/120 |

*Primary Examiner*—Delbert E. Gantz
*Assistant Examiner*—G. E. Schmitkons
*Attorney, Agent, or Firm*—D. A. Newell; S. R. La Paglia; W. L. Stumpf

[57] ABSTRACT

An improved catalytic dewaxing process using a CZH-5 zeolite having a hydrogenation component is disclosed.

7 Claims, 2 Drawing Figures

CATALYTIC DEWAXING

FIELD OF THE INVENTION

Natural and synthetic aluminosilicates are important and useful compositions having catalytic characteristics. These aluminosilicates are porous and have definite, distinct crystal structures as determined by X-ray diffraction. Within the crystals are a large number of cavities and pores whose dimensions and shapes vary from zeolite to zeolite. Variations in pore dimensions and shapes cause variations in the adsorptive and catalytic properties of the zeolites. Only molecules of certain dimensions and shapes are able to fit into the pores of a particular zeolite, while other molecules of larger dimensions or different shapes are unable to penetrate the zeolite crystals.

Because of their unique molecular sieving characteristics as well as their potentially acidic nature, zeolites are especially useful in hydrocarbon processing as adsorbents, and, as catalysts, for cracking, reforming, and other hydrocarbon transformation reactions. Although many different crystalline aluminosilicates have been prepared and tested, the search continues both for new zeolites which can be used in hydrocarbon and chemical processing and for processes to use new zeolites efficiently.

One of the important applications of shape-selective zeolites is in catalytic dewaxing. The typical hydrocarbonaceous feed from which mid-distillate fuel and lubricating oils are made has an overabundance of straight chain and slightly-branched chain paraffins. These compounds are undesirable in that they cause the stock to have a high pour point. The goal of shape-selective catalytic dewaxing is to remove selectively the compounds which provide the high pour points while leaving the other more desirable compounds substantially intact. The longer the dewaxing catalyst can be used in the dewaxing step without significant fouling, the more useful and desirable the dewaxing process.

The object of the present invention is to provide a catalytic dewaxing process using a new shape-selective zeolite of the CZH-5 type in which the dewaxing efficiency of the zeolite is greatly increased.

CZH-5 zeolites have high silica-to-alumina mol ratios and are shape-selective in that they can selectively crack normal and slightly-branched chain hydrocarbons. Even so, they have not been particularly attractive for catalytic dewaxing since their dewaxing activity appeared to be lower than that of other zeolites and since the CZH-5 zeolites fouled rapidly.

I have discovered that the selective cracking activity of the CZH-5 zeolites is surprisingly high when the catalyst is unfouled, and that the usefulness of the zeolite for shape-selective cracking can be increased to levels attractive for commercial use. The greatly improved dewaxing activity is achieved by adding a hydrogenation component to the zeolite.

BACKGROUND

In recent years, many crystalline aluminosilicates having desirable adsorption and catalytic properties have been prepared. Typically, zeolites are prepared from reaction mixtures having sources of alkali or alkaline earth metal oxides, silica, alumina, and, optionally, an organic species. However, depending upon the reaction conditions and the composition of the reaction mixture, different zeolites can be formed even if the same organic species is used. For example, zeolites ZK-4, ZSM-4, faujasite and PHI, have been prepared from tetramethylammonium compounds; and zeolites ZK-5 and ZSM-10 have been prepared from N,N'-dimethyltriethylenediammonium compounds.

U.S. Pat. No. 4,046,895, Plank et al, Sept. 6, 1977, discloses the preparation of a new family of crystalline zeolites called "ZSM-21". One member of the ZSM-21 family, ZSM-38, is described as having a composition in terms of mol ratios of oxides, in the anhydrous state, of $(0.3 \text{ to } 2.5) R_2O:(0 \text{ to } 0.8)M_2O:Al_2O:Al_2O_3$:(greater than 8) $SiO_2$, wherein R is derived from trialkyl(2-hydroxyalkyl) ammonium compounds, such as choline, and M is an alkali metal cation.

U.S. Pat. No. 4,086,186, Rubin et al, Apr. 25, 1978 and U.S. Pat. No. 4,116,813, Rubin et al, Sept. 26, 1978, disclose the preparation of a crystalline zeolite called ZSM-34, which has the composition as synthesized, and in anhydrous form, expressed as mol ratios of oxides as follows: $(0.5 \text{ to } 1.3)R_2O:(0 \text{ to } 0.15)Na_2O:(0.10 \text{ to } 0.50)K_2O:Al_2O_3:xSiO_2$ where R is an organic nitrogen-containing cation derived from choline and x is 8 to 50.

U.S. Pat. No. 4,187,283, Kokotailo et al, Feb. 5, 1980, discloses the preparation of a crystalline zeolite called ZSM-47. ZSM-47 is disclosed as having been prepared from a 2-(hydroxyalkyl)trialkylammonium compound such as choline.

Although ZSM-34, ZSM-38, and ZSM-47 are taught by the art as being prepared from choline, they have different X-ray diffraction patterns and thus, different crystal structures. CZH-5 zeolites have a still different crystal structure from ZSM-34, ZSM-38 and ZSM-47, as shown by its different X-ray diffraction pattern even though it is prepared from choline-type compounds.

A number of patents relating to catalytic dewaxing processes have issued.

U.S. Pat. No. Re. 28,398, Chen et al (of U.S. Pat. No. 3,700,585, Oct. 24, 1972) discloses catalytic dewaxing using ZSM-5 and ZSM-8.

U.S. Pat. No. 3,755,145, Orkin, Aug. 28, 1973, discloses lube oil hydrocracking with catalysts comprising ZSM-5, conventional cracking catalysts, and hydrogenation components.

U.S. Pat. No. 3,852,189, Chen, Dec. 3, 1974, discloses liquid phase dewaxing using ZSM-5.

U.S. Pat. No. 3,956,102, Chen, May 11, 1976, discloses hydrodewaxing using ZSM-5.

U.S. Pat. No. 3,980,550, Gorring, Sept. 14, 1976, discloses catalytic hydrodewaxing using a catalyst comprising ZSM-5, at least one multivalent transition metal, and at least one Group VIII noble metal.

FIGURES

DISCLOSURE OF THE INVENTION

Figure 1:
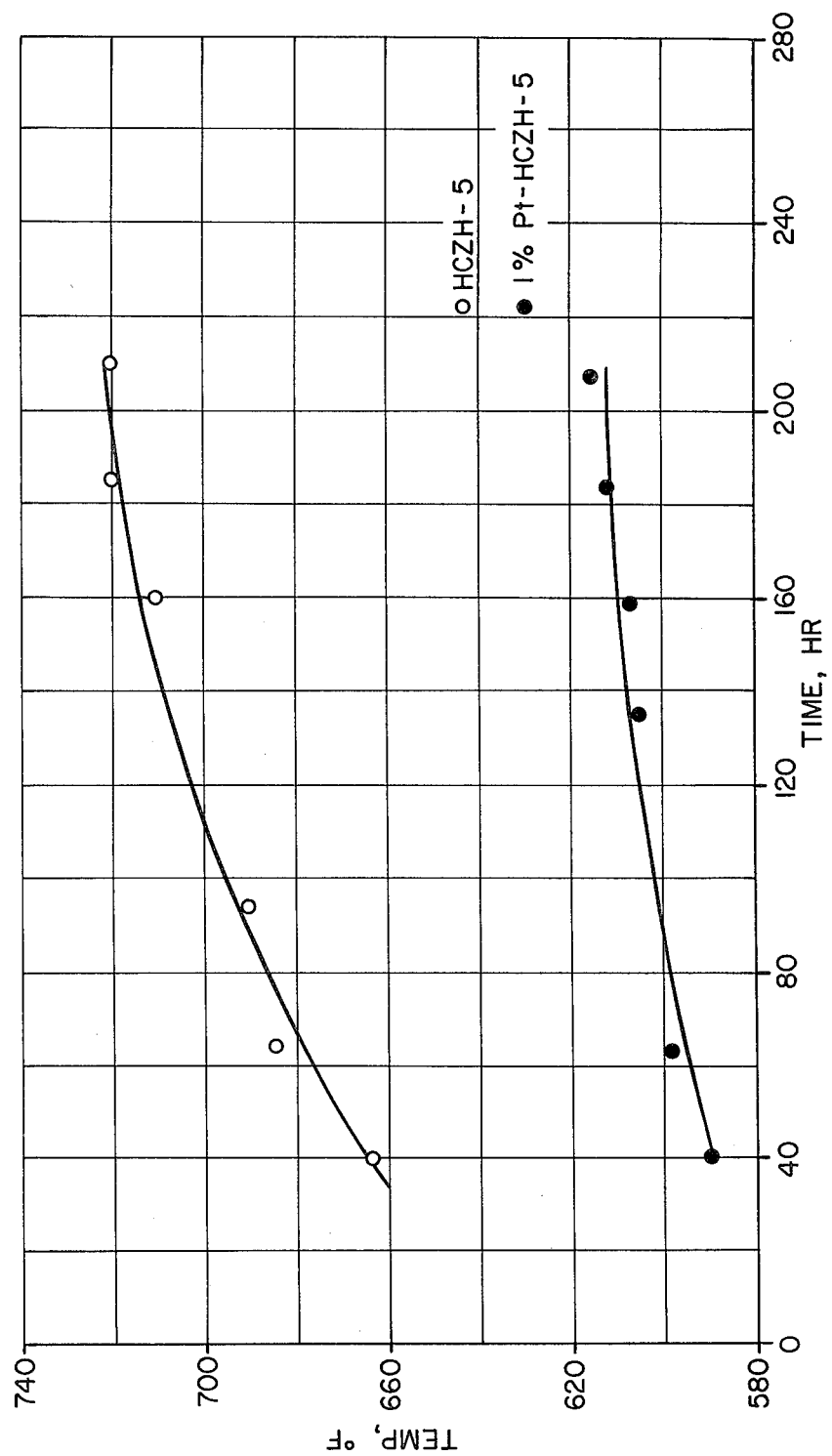
FIG. 1 shows the difference in activity and fouling rate in comparing H-CZH-5 and 1% Pt-H-CZH-5 in catalytic dewaxing to a specified conversion level.

The present invention is a dewaxing process, comprising contacting under catalytic dewaxing conditions, a hydrocarbonaceous feed which comprises normal and slightly-branched chain hydrocarbons, with a catalyst which comprises a hydrogenation component and a zeolite having a mol ratio of an oxide selected from silicon oxide, germanium oxide, and mixtures thereof to an oxide selected from aluminum oxide, gallium oxide, and mixtures thereof greater than about 5:1, and having the X-ray diffraction lines of Table I.

The CZH-5 zeolites have a mol ratio of an oxide selected from silicon oxide, germanium oxide, and mixtures thereof to an oxide selected from aluminum oxide, gallium oxide, and mixtures thereof greater than about 5:1 and having the X-ray diffraction lines of Table I. The zeolite further has a composition, as synthesized and in the anhydrous state, in terms of mol ratios of oxides as follows: (0.5 to 1.4)$R_2O$:(0 to 0.50)$M_2O$:$W_2O_3$: (greater than 5)$YO_2$ wherein M is an alkali metal cation, W is selected from aluminum, gallium, and mixtures thereof, Y is selected from silicon, germanium and mixtures thereof, and R is a cation derived from a choline-type compound. CZH-5 zeolites can have a $YO_2$:$W_2O_3$ mol ratio greater than about 5:1, preferably greater than about 40:1. The range of $YO_2$:$W_2O_3$ mol ratios is preferably from about 8:1 to 150:1, more preferably from about 10:1 to 100:1, and most preferably from about 40:1 to about 100:1. Preferably, CZH-5 is an aluminosilicate wherein W is aluminum and Y is silicon.

CZH-5 zeolites are synthesized by preparing an aqueous mixture containing sources of an organic nitrogen-containing compound, an oxide selected from aluminum oxide, gallium oxide, and mixtures thereof, and an oxide selected from silicon oxide, germanium oxide, and mixtures thereof, and having a composition, in terms of mol ratios of oxides, falling within the following ranges: $YO_2/W_2O_3$, 5:1 to 350:1; $R_2O/W_2O_3$ 0.5:1 to 40:1; wherein Y is selected from silicon, germanium, and mixtures thereof, W is selected from aluminum, gallium and mixtures thereof, and R is a cation derived from a choline-type compound; maintaining the mixture at a temperature of at least 100° C. until the crystals of said zeolite are formed; and recovering said crystals.

CZH-5 zeolites have a crystalline structure whose X-ray powder diffraction pattern shows the following characteristic lines:

TABLE I

| d(A) | Intensity |
| --- | --- |
| 11.85 ± 0.10 | S |
| 11.60 ± 0.10 | M |
| 9.97 ± 0.05 | M |
| 4.25 ± 0.02 | VS |
| 3.87 ± 0.01 | M |
| 3.83 ± 0.01 | M |
| 3.46 ± 0.01 | M |

A typical CZH-5 aluminosilicate zeolite has the X-ray diffraction pattern of Table II.

TABLE II

| 2 Θ | d(A) | $I/I_o$ |
| --- | --- | --- |
| 7.46 | 11.85 | 50 |
| 7.63 | 11.60 | 30 |
| 8.87 | 9.97 | 25 |
| 14.78 | 5.99 | 3 |
| 15.25 | 5.81 | 4 |
| 18.74 | 4.73 | 14 |
| 18.95 | 4.68 | 5 |
| 19.15 | 4.63 | 8 |
| 20.06 | 4.43 | 5 |
| 20.92 | 4.37 | 3 |
| 21.32 | 4.25 | 100 |
| 21.77 | 4.08 | 14 |
| 21.87 | 4.06 | 7 |
| 21.98 | 4.04 | 15 |
| 22.47 | 3.96 | 6 |
| 22.96 | 3.87 | 37 |
| 23.19 | 3.83 | 28 |
| 23.83 | 3.73 | 3 |
| 24.47 | 3.64 | 3 |
| 25.19 | 3.54 | 6 |
| 25.77 | 3.46 | 16 |
| 26.30 | 3.39 | 11 |
| 26.80 | 3.33 | 13 |
| 26.94 | 3.31 | 5 |
| 27.98 | 3.19 | 7 |
| 28.84 | 3.14 | 3 |
| 29.30 | 3.05 | 5 |
| 30.75 | 2.91 | 3 |
| 30.93 | 2.89 | 6 |

These values were determined by standard techniques. The radiation was the K-alpha/doublet of copper and a scintillation counter spectrometer with a strip-chart pen recorder was used. The peak heights I and the positions, as a function of 2 $\theta$ where $\theta$ is the Bragg angle, were read from the spectrometer chart. From these measured values, the relative intensities, $100I/I_o$, where $I_o$ is the intensity of the strongest line or peak, and d, the interplanar spacing in Angstroms corresponding to the recorded lines, were calculated. The X-ray diffraction pattern of Table I is characteristic of all species of CZH-5 family compositions. The zeolite produced by exchanging the metal or other cations present in the zeolite with various other cations yields substantially the same diffraction pattern although there can be minor shifts in interplanar spacing and variations in relative intensity. Minor variations in the diffraction pattern can also result from variations in the choline-type compound used in the preparation and from variations in the silica-to-alumina mol ratio of a particular sample. Calcination can also cause minor shifts in the X-ray diffraction pattern. Notwithstanding these minor perturbations, the basic crystal lattice structure remains unchanged.

CZH-5 zeolites can be suitably prepared from an aqueous solution containing sources of an alkali metal oxide, a choline-type compound, an oxide of aluminum or gallium, or mixture of the two, and an oxide of silicon or germanium, or mixture of the two. The reaction mixture should have a composition in terms of mol ratios of oxides falling within the following ranges:

| | Broad | Preferred |
| --- | --- | --- |
| $YO_2/W_2O_3$ | 5–350 | 12–200 |
| $M_2O/W_2O_3$ | 0.5–20 | 1–17 |
| $R_2O/W_2O_3$ | 0.5–40 | 5–25 |
| $MCl/W_2O_3$ | 20–200 | 50–150 |
| $H_2O/W_2O_3$ | 500–20000 | 1500–15000 | wherein R is disclosed above, Y is silicon, germanium or both, and W is aluminum, gallium or both. M is an alkali metal, preferably sodium. Typically, an alkali metal hydroxide or alkali metal halide is used in the reaction mixture; however, these components can be omitted so long as the equivalent basicity is maintained. The choline-type compound can provide hydroxide ion.

By "choline-type compound" is meant an organic nitrogen compound having the formula $R^1R^2R^3NR^4OH$—X. $R^1$, $R^2$ and $R^3$ are $C_1$ to $C_4$ lower alkyl; $R^4$ is $C_1$ to $C_5$ alkyl and X is an anion. The choline-type compounds are generally trialkyl (2-hydroxyalkyl- )ammonium compounds. The preferred choline-type compound has the choline (or trimethyl(2-hydroxyethyl)ammonium)cation. The choline-type compound can be in the form of the hydroxide, e.g., choline hydroxide, the halide, e.g., choline chloride, bromide, or fluoride, or it can be associated with other suitable anions such as sulfates, acetates, and nitrates. The reaction mixture which allows the synthesis of CZH-5 is typically prepared by the addition to water of choline chloride, choline fluoride, choline hydroxide, or mixtures of these and other choline-type compounds.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica and silica hydroxides. Gallium and germanium can be added in forms corresponding to their aluminum and silicon counterparts.

Salts, particularly alkali metal halides such as sodium chloride, can be added to or formed in the reaction mixture. They may facilitate the crystallization of the zeolite and prevent silica occlusion in the lattice, as disclosed in U.S. Pat. No. 3,849,463, Dwyer et al, Nov. 19, 1974, incorporated herein by reference.

The reaction mixture is maintained at an elevated temperature until the crystals of the zeolite are formed. The temperatures during the hydrothermal crystallization step are typically maintained at a temperature of from about 100° C. to about 235° C., preferably from about 120° C. to about 200° C. and most preferably from about 135° C. to about 165° C. The crystallization period is typically greater than 3 days and preferably from about 7 days to about 50 days.

The hydrothermal crystallization is conducted under pressure and usually in an autoclave so that the reaction mixture is subject to autogenous pressure. Although the reaction mixture can be stirred during crystallization, preferably it is not.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, CZH-5 zeolite crystals. The drying step can be performed at atmospheric or subatmospheric pressures.

During the hydrothermal crystallization step, the CZH-5 crystals can be allowed to nucleate spontaneously from the reaction mixture. The reaction mixture can also be seeded with CZH-5 crystals both to direct, and accelerate the crystallization, as well as to minimize the formation of undesired aluminosilicate contaminants. If the reaction mixture is seeded with CZH-5 crystals, the concentration of the choline-type organic nitrogen compound can be greatly reduced or eliminated, but it is preferred to have some organic compound present, e.g., an alcohol.

The CZH-5 aluminosilicate can be manufactured into a wide variety of physical forms. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with a binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Use of a material in conjunction with the synthetic zeolite, i.e., combined therewith, which is active, tends to improve the conversion and selectivity of the catalyst in certain organic conversion processes. Inactive materials suitably serve as diluents to control the amount of conversion in a given process so that products can be obtained economically without employing other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the synthetic zeolites of this invention include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite, or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the CZH-5 zeolites can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

The CZH-5 zeolites can also be composited with other zeolites such as synthetic and natural faujasites, (e.g., X and Y) erionites, and mordenites. They can also be composited with purely synthetic zeolites such as those of the ZSM series. The combination of zeolites can also be composited in a porous inorganic matrix.

The relative proportions of the crystalline aluminosilicate zeolite of this invention and inorganic oxide gel matrix can vary widely. The CZH-5 content can range from about 1 to about 90 percent by weight but is more usually in the range of about 2 to about 50 percent by weight of the composite.

The following examples illustrate the preparation of CZH-5 through hydrothermal crystallization.

EXAMPLE 1

In a 500 ml Teflon bottle, 0.2902 grams of sodium aluminate (48% $Al_2O_3$, 33% $Na_2O$), 12.46 grams choline chloride and 50 grams of water were mixed. To this mixture was added a second solution prepared by dissolving 6.65 grams sodium chloride in 100 grams of distilled water.

To the solutions so prepared, a third solution comprising N-sodium silicate solution (28% SiO$_2$), 46.34 grams, in 150 grams distilled water was added. The final reaction mixture was obtained by adding a hydrochloric acid solution prepared by the mixture of 2.68 grams of concentrated HCl (36% HCl) in 71.88 grams distilled water.

The Teflon reaction bottle was sealed and the reaction mixture was autoclaved in an oven at 150° C. for 15 days until the crystalline precipitate was formed.

The crystals were allowed to settle, the clear supernatant liquid was decanted and the crystals were filtered, washed with distilled water to remove chloride ions and dried for 16 hours at 120° C. and 20 inches of vacuum under nitrogen. The X-ray diffraction pattern of the product was taken and was found to be that of Table III which is characteristic of CZH-5.

TABLE III

| d(A) | Intensity |
|---|---|
| 11.79 | S |
| 11.56 | M |
| 9.94 | M |
| 5.97 | W |
| 5.79 | W |
| 4.72 | W |
| 4.67 | W |
| 4.62 | W |
| 4.42 | W |
| 4.24 | VS |
| 4.07 | VS |
| 4.04 | S |
| 3.96 | W |
| 3.87 | M |
| 3.82 | M |
| 3.72 | W |
| 3.63 | W |
| 3.53 | W |
| 3.45 | M |
| 3.38 | W |
| 3.32 | W |
| 3.18 | W |
| 3.13 | W |
| 3.04 | W |
| 2.91 | W |
| 2.88 | W |

EXAMPLE 2

In a 500 ml Teflon bottle, 0.5743 grams of sodium aluminate (48% Al$_2$O$_3$, 33% Na$_2$O), 12.33 grams choline chloride and 50 grams of water were mixed. To this mixture was added a second solution prepared by dissolving 6.54 grams sodium chloride in 100 grams of distilled water.

To the solution so prepared, a third solution comprising N-sodium silicate solution (28% SiO$_2$), 45.86 grams, in 150 grams distilled water was added. The final reaction mixture was obtained by adding a hydrochloric acid solution prepared by the mixture of 2.96 grams of concentrated HCl (36% HCl) in 72.0 grams distilled water.

The Teflon reaction bottle was sealed and the reaction mixture was autoclaved in an oven at 150° C. for 15 days until the crystalline precipitate was formed.

The crystals were allowed to settle, the clear supernatant liquid was decanted and the crystals were filtered, washed with distilled water to remove chloride ions and dried for 16 hours at 120° C. and 20 inches of vacuum under nitrogen. The X-ray diffraction pattern of the product was taken and was found to be that of Table IV, typical of the CZH-5 zeolite.

TABLE IV

| d(A) | Intensity |
|---|---|
| 11.79 | S |
| 11.56 | M |
| 9.94 | M |
| 5.97 | W |
| 5.79 | W |
| 4.72 | M-W |
| 4.67 | W |
| 4.62 | W |
| 4.42 | W |
| 4.24 | S |
| 4.07 | M |
| 4.04 | M |
| 3.96 | W |
| 3.87 | S |
| 3.82 | S |
| 3.72 | W |
| 3.63 | W |
| 3.53 | W |
| 3.45 | M |
| 3.38 | M |
| 3.32 | M |
| 3.18 | W |
| 3.13 | W |
| 3.04 | W |
| 2.91 | W |
| 2.88 | W |

EXAMPLES 3-7

Examples 3-7 illustrate the preparation of CZH-5 and the effect of the length of time the reaction mixture is maintained at elevated temperature and autogenous pressure on the formation of the zeolite crystals.

The reaction mixtures for Examples 3-7 were prepared to have the following mol ratios of ingredients:

| | |
|---|---|
| SiO$_2$/Al$_2$O$_3$ | 80:1 |
| R$_2$O/Al$_2$O$_3$ | 16:1 (R = choline) |
| Na$_2$O/Al$_2$O$_3$ | 4.0:1 |
| H$_2$O/Al$_2$O$_3$ | 8328:1 |
| NaCl/Al$_2$O$_3$ | 84:1 |
| wt % Al$_2$O$_3$ and SiO$_2$ | 3 |
| wt % NaCl | 3 |

For each of the experiments of Examples 3 to 7 the reaction mixture was maintained at 150° C. under autogenous pressure without stirring during crystallization.

Table V presents the crystallization time and the results of the analysis of the products produced.

TABLE V

| Example | 3 | 4 | 5 | 6 | 7 |
|---|---|---|---|---|---|
| Crystallization Time (days) | 3 | 7 | 13 | 15 | 16 |
| Prod. Analysis: Structure (XRD) | amor | 50% CZH-5 | 75% CZH-5 | 100% CZH-5 | 100% CZH-5 |
| Composition | | | | | |
| LOI* | 6.68 | 8.05 | 3.03 | 4.33 | 8.96 |
| SiO$_2$/Al$_2$O$_3$ | 37.5 | 42.5 | 53.7 | 64.2 | 54.2 |
| R$_2$O/Al$_2$O$_3$ | 1.02 | 1.08 | 1.33 | 1.38 | 1.33 |
| Na$_2$O/Al$_2$O$_3$ | .28 | .23 | .17 | .20 | .23 |

*loss on ignition - 540° C., 10 hours, in air.

The hyrogenation component of the dewaxing catalyst is typically a transition metal. The hydrogenation component can be present as the metal or in the form of a compound such as the metal oxide or metal sulfide. Mixtures of metals or metal compounds can be used. The preferred hydrogenation components are Group VIB metals, and Group VIII metals; Group VIII noble metals, iridium, palladium, and platinum are particularly preferred.

The hydrogenation metals can be impregnated into the zeolite or ion-exchanged into it. Or, the metals can be physically intimately admixed with the zeolite using standard methods known to the art. Additionally, the metals can be occluded in the crystal lattice by having the desired metals present as ions in the reaction mixture from which the CZH-5 zeolite is prepared.

Typical ion-exchange techniques involve contacting the synthetic zeolite with a solution containing a salt of the desired replacing cation or cations. Although a wide variety of salts can be employed, chlorides and other halides, nitrates, and sulfates are particularly preferred. Representative ion-exchange techniques are disclosed in a wide variety of patents including U.S. Pat. Nos. 3,140,249, 3,140,251, and 3,140,253. Ion-exchange can take place either before or after the zeolite is calcined.

Following contact with the salt solution of the desired replacing cation, the zeolite is typically washed with water and dried at a temperature ranging from 65° C. to about 315° C. After washing, the zeolite can be calcined in air or inert gas at temperatures ranging from about 200° C. to 820° C. for periods of time ranging from 1 to 48 hours, or more, to produce a catalytically-active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures. Where a metal compound is used, typically the metal is ion-exchanged into the zeolite and the oxide or sulfide, for example, is formed in situ.

The hydrocarbonaceous feedstocks which are dewaxed contain carbon compounds and can be from many different sources, e.g., virgin petroleum fractions, recycle petroleum fractions, shale oil, liquefied coal, tar sand oil; in general, from any fluid which contains normal and slightly-branched chain carbon compounds. The feed can be metal containing or without metals, it can also have high or low nitrogen or sulfur impurities. It is most desirable that the feed have as low a nitrogen or sulfur content as is consistent with economical refinery operation. Although the catalyst will dewax nitrogen- and sulfur-containing feeds, it tends to foul rapidly even with the hydrogenation component present. The feed nitrogen level should be below about 50 ppmw and preferably below 10 ppmw; the feed sulfur level should be below 50 ppm and preferably below 10 ppm. These levels are easily achieved by standard hydrocracking processes.

The dewaxing process can take place in any convenient mode, for example, in fluidized bed, moving bed, or fixed bed reactors depending on the types of process desired. The formulation of the catalyst particles will vary depending on the conversion process and method of operation.

The process conditions are those of hydrodewaxing—a mild hydrocracking; dewaxing in the absence of hydrogen results in a rapid coking of the catalyst. Reaction conditions can include temperatures from about 275° C. to about 600° C.; LHSV of 0.5 to 200; pressures from atmospheric to 200 bar; and 50 to 600 SCM hydrogen per barrel of feed.

EXAMPLE 8

A test was performed to illustrate the dramatic benefit of using a hydrogenation component on CZH-5 on catalytic dewaxing.

The feed used had the following characteristics:

| °API | 34.6 |
|---|---|
| S, ppm | 13 |
| N, ppm | 1.0 |
| Pour point, °C. | +26 |
| VI | 107 |
| paraffins, Vol % | 43.3 |
| naphthenes, Vol % | 46.3 |
| aromatics, Vol % | 10.3 |
| Distillation, °C. (D1160): | |
| 5/10 | 350/360 |
| 30/50 | 370/378 |
| 70/90 | 387/404 |
| 95/EP | 416/441 |

Figure 2:
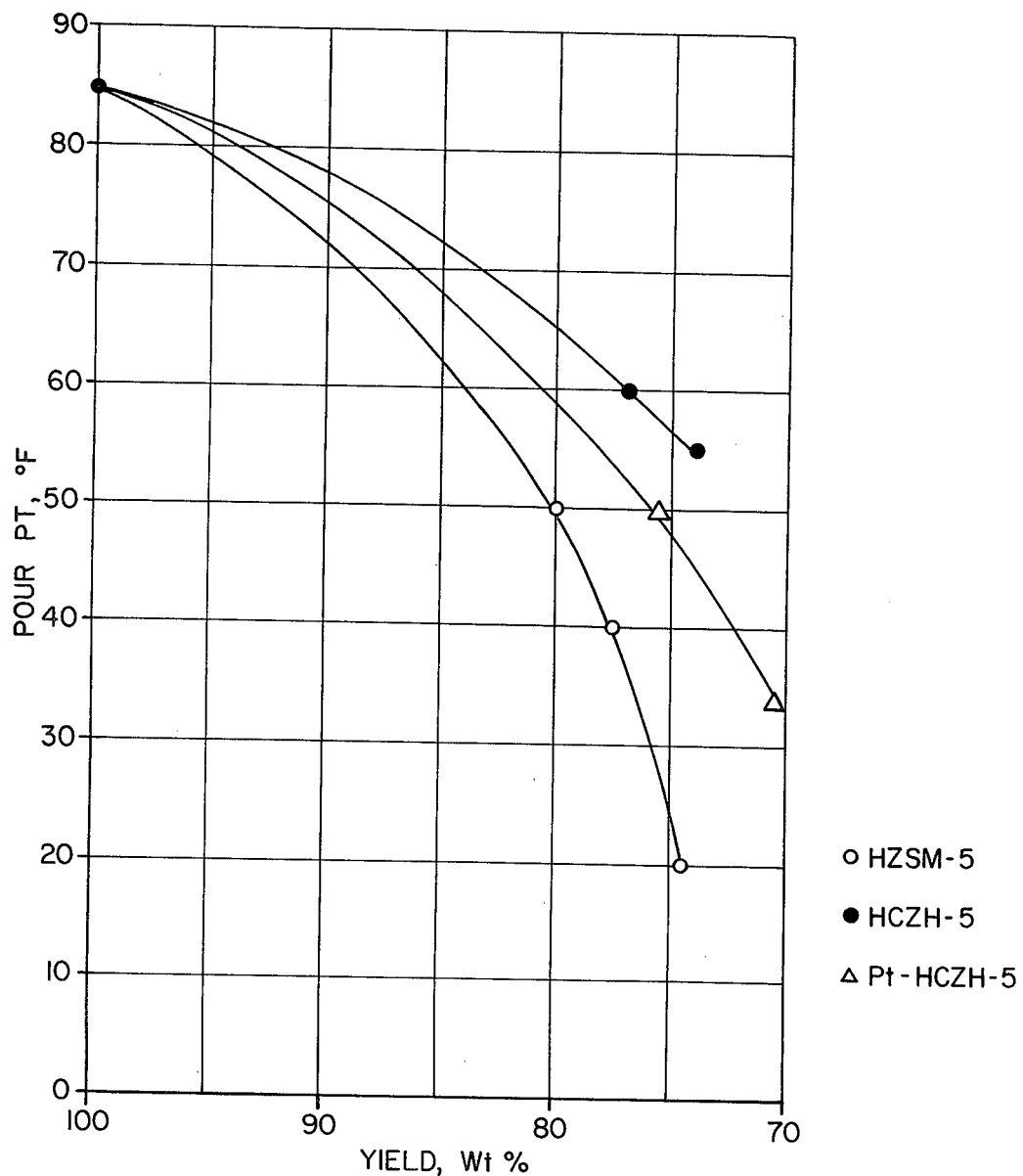
FIG. 2 shows the improved yield-pour point characteristics of CZH-5 having a hydrogenation component compared to CZH-5 which does not.

The reaction conditions were: LHSV=2; 283 SCM/B hydrogen; conversion to <371° C.=20%; pressure=68.9 bar. The reactor temperature was increased with time to maintain the conversion level. The catalysts were H-CZH-5 and 1% Pt-H-CZH-5; the results appear in FIG. 1. The data indicate a dramatic increase in activity (decrease in fouling rate) by using the hydrogenation component. FIG. 2 shows the improved pour point-yield characteristics of the Pt-H-CZH-5 as compared to the H-CZH-5; in achieving the same pour point, the Pt-CZH-5 yielded more product than the H-CZH-5.

EXAMPLE 9

The 1% Pt-H-CZH-5 was tested for dewaxing activity on a nitrogen- and sulfur-containing feed having the following characteristics:

| °API | 33.5 |
|---|---|
| S, wt % | 1.25 |
| N, ppm | 113 |
| Pour Point, °C. | 2 |
| Distillation, °C. (D86): | |
| Start/5 | 230/257 |
| 10/30 | 266/283 |
| 50 | 298 |
| 70/90 | 315/351 |
| 95/EP | 366/382 |

Reaction conditions included: LHSV=2; 198 SCM/bbl hydrogen; pressure=41.4 bar. The temperature after 10 hours onstream for 6% conversion was 316° C. The catalyst fouled rapidly to a temperature greater than 371° C. in 3 days.

Although the catalyst exhibited dewaxing activity on the high-nitrogen feed, the activity was not commercially useful for fixed bed operation.

What is claimed is:

1. A dewaxing process, comprising contacting under catalytic dewaxing conditions, a hydrocarbonaceous feed which comprises normal and slightly-branched chain hydrocarbons and which has a feed nitrogen content of less than about 50 ppmw and a feed sulfur content of less than about 50 ppmw with a catalyst which comprises a hydrogenation component and a zeolite having a mol ratio of an oxide selected from silicon oxide, germanium oxide, and mixtures thereof to an oxide selected from aluminum oxide, gallium oxide and mixtures thereof greater than about 5:1, and having the X-ray diffraction lines of Table I.

2. The process of claim 1 wherein said zeolite is an aluminosilicate.

3. The process of claim 2 wherein said mol ratio is greater than about 40:1.

4. The process of claim 1 wherein said hydrogenation component is selected from Group VIB metals and compounds thereof, Group VIII metals and compounds thereof, and mixtures of said metals and metal compounds.

5. The process of claim 4 wherein said hydrogenation component is a Group VIII metal or compound thereof or mixture of Group VIII metals or compounds thereof.

6. The process of claim 5 wherein said hydrogenation component is selected from platinum, palladium, and iridium.

7. The process of claim 1 wherein said feed has a sulfur content of less than about 10 ppm by weight and a nitrogen content of less than about 10 ppm by weight.

* * * * *